(No Model.)

G. B. FOOTE.
NUT ARBOR.

No. 311,479. Patented Feb. 3, 1885.

Witnesses
Harry R. Comly
Otto Peterson

INVENTOR
George B. Foote

UNITED STATES PATENT OFFICE.

GEORGE B. FOOTE, OF HELENA, MONTANA TERRITORY.

NUT-ARBOR.

SPECIFICATION forming part of Letters Patent No. 311,479, dated February 3, 1885.

Application filed February 1, 1884. (No model.)

*To all whom it may concern:*

Be it known that I, GEORGE B. FOOTE, of Helena, Montana Territory, have invented a new and useful Nut-Arbor, of which the following is a specification.

My invention relates to improvements in arbors upon which to face or square up machine and other screw nuts; and the objects of my invention or improvements are, first, to provide an oscillating shoulder against which the back or inner face of a nut may impinge while the front or outer face of such nut is being turned up to a true face, the oscillatory movement of such shoulder allowing the nut to adjust itself so that the axis of its thread is concentric to the axis of the thread on the arbor, the center of oscillation being on or near the impinging plane of bearing between such nut and shoulder; second, to provide means of automatically relieving a nut from a firm bearing against the shoulder of a nut-arbor, so that such nut can be easily run off the arbor while the lathe or other machine in which the arbor is used is running backward; third, to provide a simple method of attaching an oscillating shoulder-piece to a nut-arbor so that such shoulder-piece may be free to move and at the same time remain securely attached to the arbor. I attain these objects by the mechanism illustrated in the accompanying drawings, in which—

Figure 3:
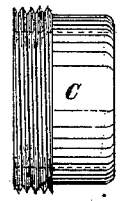
Figure 4:
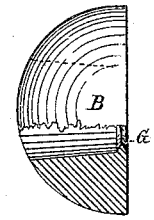
Figure 1:
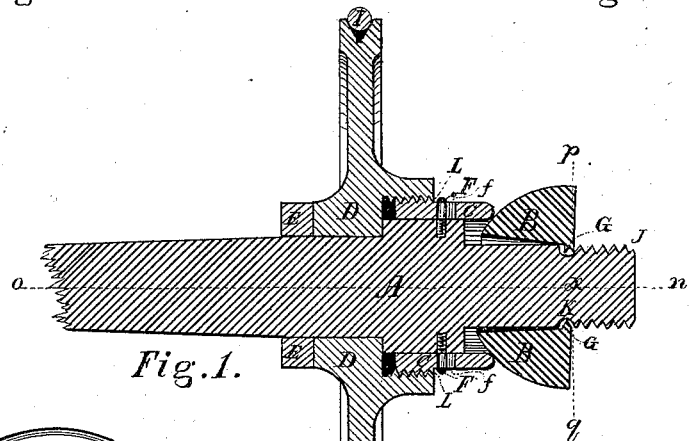
Figure 2:
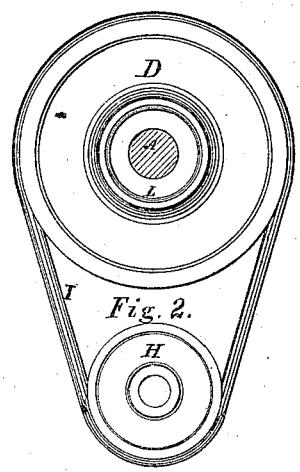
Figure 5:
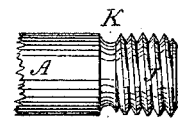

Figure 1 is a longitudinal section of the entire device; Fig. 2, a front view of friction-wheel for operating the relieving collar or sleeve C; Fig. 3, a side view of the relieving collar or sleeve C; Fig. 4, a side view in partial section of the oscillating shoulder-piece B; Fig. 5, a side view of the threaded end of the arbor A, upon which nuts are to be screwed for the purpose of squaring or facing them up.

The same letters refer to the same parts throughout the several views.

The arbor A on the end toward *o* is turned to a taper, or otherwise fitted to the lathe-spindle or other machine in which the device is to be used. The outer end toward *n* is threaded to fit freely in the nuts to be squared. The dotted line *o n* represents the axis of revolution of the arbor, and the dotted line *p q* is on a plane of revolution at a right angle thereto.

B is an oscillatory shoulder-piece against which the nuts impinge, and is made semispherical in form on the back and flat in front, *x* being the center of such spherical portion and the center of oscillation, and is at or near the plane of impact between nut and shoulder-piece. To construct the piece B, I first tap out a thread to fit the threaded end of the arbor. One side I face up to a plane and the other I turn to the form of a half-sphere. I then bore out from the spherical side all of the threads but one, G, and enlarge the hole in tapering form, as shown.

C is a sliding collar or sleeve against which the back or globular portion of piece B impinges, and is fitted so as to slide a short distance longitudinally on the arbor A. It is threaded on its back end, as shown, and is prevented from turning on the arbor, and also governed in the extent of its longitudinal motion, by the slots *f f* and the pins F F.

D is a friction-wheel which controls the longitudinal motions of the sleeve C, and the front end of its hub is internally threaded at L to fit the thread on the sleeve C, and said sleeve C is capable of revolving a few turns on the arbor A.

E is a collar attached, by screw, pin, or otherwise, rigidly to the arbor A, and is designed to take the back-thrust through B, C, and D of a nut to be operated on.

H is a stationary wheel or similar device connected by the belt I to the friction-wheel D.

J is the threaded portion of the arbor A, the back end of the thread ending in the groove K. The shoulder-piece B is screwed over the thread J until the remaining thread G enters the groove K, when it is free to oscillate a sufficient amount to allow a nut impinging against it to assume such a position on the arbor as that the axis of its thread is at right angles to the plane of its revolution, and at the same time the shoulder-piece B is so attached to the arbor as not to come off, except when intended.

The operation of the device is as follows: The arbor having been fitted to the spindle of a lathe or other machine having a go-ahead and backing motion, like an ordinary screw-cutting lathe, the lathe is thrown on its go-ahead motion, when for a few revolutions of the arbor A the friction-wheel D is held stationary by means of a friction device consisting of the belt I, which passes around the stationary pulley H, or by other equivalent friction device, until the collar or sleeve C is thrown forward to its full extent as controlled by the pins F F and the slots $ff$, when it (wheel D) begins to revolve with the arbor A. A nut to be squared or faced up is then placed on the thread J and screwed up to the shoulder-piece B, which shoulder-piece, being free to wabble or oscillate, will adjust itself to any imperfection of the nut and come to a bearing against the sleeve C in such manner that the axis of the thread of the nut is coincident with the axis of the arbor A, in which position it will be held for squaring up or facing. After this is done the lathe is reversed, when the friction-wheel D is again held stationary for a few revolutions, thus withdrawing the collar or sleeve C from its impact on piece B, leaving B and the nut both loose on the arbor, so that a slight touch on the nut will run it off and leave the arbor free to receive another, when the operation can be repeated.

I am aware that prior to my invention nut-arbors have been constructed having a movable shoulder against which nuts may impinge so as to bring the axis of thread at right angle to the plane of revolution. I therefore do not claim such a device, broadly. My invention differs from such devices heretofore used in being so constructed as to bring the plane of impact between nut and shoulder at or nearly coincident with the center-point of oscillation, thus allowing a nut to adjust itself on the arbor and come to a bearing on the shoulder without such friction as would tend to throw the axis of thread out of line with the axis of revolution of the arbor.

What I do claim as my invention, and desire to secure by Letters Patent, is—

1. A nut-arbor, in combination with an oscillatory shoulder-piece, B, articulated thereto, as herein specified, said shoulder-piece having the center of its oscillation, $x$, near the plane of impact between the nut and shoulder-piece, substantially as described.

2. A nut-arbor having a movable sleeve, C, in combination with a movable shoulder-piece, B, friction-wheel D, stationary wheel H, and belt I, whereby the rotation of the arbor in one direction will tend to secure the sleeve in contact with the shoulder-piece to hold the nut securely, while the reverse rotation will retract the sleeve and release the shoulder-piece so as to allow the removal of the nut, substantially as described.

3. The combination of a threaded nut-arbor having a broad annular groove with a movable shoulder-piece having a single thread, substantially as specified.

GEORGE B. FOOTE.

Witnesses:
HARRY R. COMLY,
OTTO PETERSON.

Correction in Letters Patent No. 311,479.

It is hereby certified that in Letters Patent No. 311,479, granted February 3, 1885, upon the application of George B. Foote, of Helena, Montana Territory, for an improvement in "Nut-Arbors," an error appears in lines 77-78, page 1, of the printed specification, by the insertion of the words "said sleeve C;" that said words should be omitted, and the Letters Patent read with this omission to make it conform to the record of the case in the Patent Office.

Signed, countersigned, and sealed this 17th day of March, A. D. 1885.

[SEAL.]
M. L. JOSLYN,
*Acting Secretary of the Interior.*

Countersigned:
R. G. DYRENFORTH,
*Acting Commissioner of Patents.*